US012170646B1

United States Patent
Li et al.

(10) Patent No.: US 12,170,646 B1
(45) Date of Patent: Dec. 17, 2024

(54) OPERATING CONTAINERS IN EXISTING NETWORK NAMESPACES IN A SERVICE PROVIDER NETWORK

(71) Applicant: Amazon Technologies, Inc., Seattle, WA (US)

(72) Inventors: Yang Li, Parker, CO (US); Xu Zhao, Bellevue, WA (US); Kai Gao, Bellevue, WA (US); Yue Yang, Redmond, WA (US); Vikram Anbazhagan, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/237,081

(22) Filed: Aug. 23, 2023

(51) Int. Cl.
*H04L 61/3015* (2022.01)
*H04L 45/655* (2022.01)
*H04L 61/4511* (2022.01)
*H04L 67/10* (2022.01)
*H04L 45/76* (2022.01)

(52) U.S. Cl.
CPC ........ *H04L 61/3015* (2013.01); *H04L 45/655* (2022.05); *H04L 61/4511* (2022.05); *H04L 67/10* (2013.01); *H04L 45/76* (2022.05)

(58) Field of Classification Search
CPC ............. H04L 61/3015; H04L 61/4511; H04L 45/655; H04L 45/76; H04L 67/10
USPC ......................................................... 709/245
See application file for complete search history.

(56) References Cited

U.S. PATENT DOCUMENTS

| 2017/0171144 A1* | 6/2017 | Sagiraju | H04L 61/5061 |
| 2019/0114237 A1* | 4/2019 | Kumar | G06F 9/45533 |
| 2020/0356672 A1* | 11/2020 | Paulraj | H04L 63/0823 |
| 2021/0042368 A1* | 2/2021 | Liu | G06F 16/955 |
| 2021/0168125 A1* | 6/2021 | Vemulpali | H04L 63/0263 |
| 2022/0350675 A1* | 11/2022 | Navali | H04L 47/781 |
| 2023/0070224 A1* | 3/2023 | Huo | G06F 9/45558 |
| 2024/0020267 A1* | 1/2024 | Liu | G06F 16/2365 |

FOREIGN PATENT DOCUMENTS

WO  WO-2011110534 A2 * 9/2011 ....... G06F 17/30233

* cited by examiner

*Primary Examiner* — Ruolei Zong
(74) *Attorney, Agent, or Firm* — Lee & Hayes, P.C.

(57) ABSTRACT

This disclosure describes a container management tool of a container management service of a service provider network that operates a first container in a network mode associated with a software generated namespace generated by the container management tool. The container management tool determines a location of the software generated namespace and adds a link to a desired, e.g., existing application network namespace to the software generated namespace. The container management tool, using an application namespace creation script, generates a name for the desired application network namespace. The service provider network executes one or more first applications in the first container, wherein executing the one or more first applications in the first container comprises the first container accessing the software generated namespace and following the link to the desired application network namespace.

20 Claims, 10 Drawing Sheets

OPERATING CONTAINERS IN EXISTING NETWORK NAMESPACES IN A SERVICE PROVIDER NETWORK

BACKGROUND

Service providers offer cloud-based services via service provider networks to fulfill user's computing service needs without the users having to invest in and maintain computing infrastructure required to implement the services. These service providers are generally in the form of on-demand computing platforms that may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

Users of service provider networks often create the applications on the instances and then execute the applications. Generally, the applications need to make calls to both the services provided by the service provider network as well as the application user's resources within the user's own network environment. Separate network namespaces are built for different users' applications. The applications may be run under a relatively isolated network environment. The isolated network environment may utilize the resources and rules of two different environments, for example, internet protocol (IP) tables, routing tables, domain name system (DNS) servers, etc.

Challenges in such situations may include running third party applications in a container image in a current existing network namespace. Additionally, it can be difficult to package the service provider's own applications into container images that allow the applications to run in an existing network namespace. Containers are widely used in modern software development since they provide a lightweight and efficient way to run applications. Container management and orchestration tools typically run the containers in namespaces that are isolated environments that provide process and resource management. However, many existing applications create their own namespaces and there is currently no effective way to ask a container management tool to use the existing namespaces. For example, for all the network modes that a particular container management tool provides, none of them may directly work with existing network namespace, except for one scenario where one container may use the network namespace created for another container. This situation is similar for other container management tools.

One typical solution is to run the container in one of many network modes and then build bridges, virtual ethernet (VETH) pairs, routing rules, and IP table rules to let the container use the resources in an existing network namespace. However, the work involved is tedious and becomes harder and harder as the existing network namespace becomes more complicated. Additionally, this method requires large amounts of testing is prone to errors.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
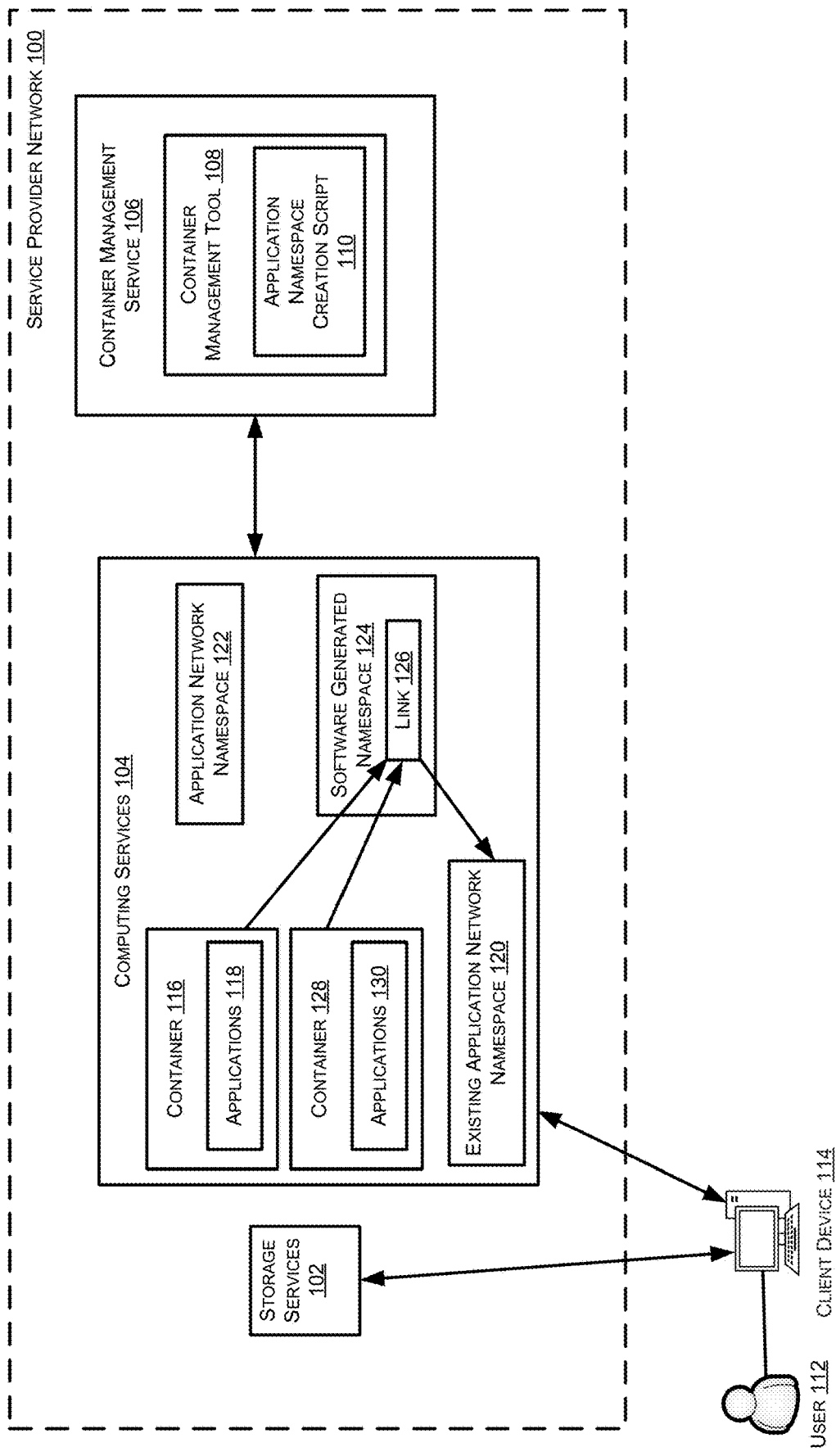
FIG. 1 schematically illustrates a system-architecture diagram of an example service provider network that includes a container management service.

This disclosure describes, at least in part, techniques and architecture for operating a container or containers inside existing network namespaces in service provider networks. Such capability enables containerized applications to seamlessly integrate with existing network infrastructures, thereby providing organizations with the benefits of containerization without the need to re-architect their network infrastructure. Generally, it may be important to use existing namespaces because it is desirable to exert control over which networks a container may access. For example, it is difficult for users to recreate security set-up and security checks for namespaces. In particular, users do not want to break a security contract. Also, users do not want to have to apply all the security constraints again when establishing a network namespace for execution therein. Additionally, when creating a network's namespace, thousands of lines of code need to be built up for, as an example, firewall, routing, domain name system (DNS) servers, etc. This requires a large amount of effort and work to create the network namespace.

More particularly, in configurations, a service provider network includes multiple services that provide services to users that access the service provider network. As an example, the service provider network includes a storage service, a computing service, and a container management service. Users may thus create applications on instances (e.g., virtual machines (VMs)) provided by the computing service. The applications may be executed in containers on the instances. The users may also utilize the storage service to store, for example, data, results, etc.

In configurations, for operating a container or containers inside an existing network namespace, a container management tool of the container management service is initialized thereby creating a container. During initialization, routing rules, network rules, table rules, etc. may be created for the container. In configurations, these network pieces may interfere with the process of having a container operate within an existing network namespace. Thus, in configurations, these potentially interfering network pieces introduced by the container management tool may be removed from the container.

In configurations, the container management tool determines if an application network namespace has been created. This application network namespace may be created upon activation, for example, of the server executing the container management tool. As is known, a network namespace has an independent network stack, e.g., its own private routing table, set of Internet Protocol (IP) addresses, socket listing, connection tracking table, firewall, and other network-related resources. Upon activation of the server, such an application network namespace may be created by the server. If this application network namespace has been created, the container management tool may determine if an application namespace creation script is ready. If the application namespace creation script is not ready, then the container management tool may generate the application namespace creation script. When the application namespace creation script is ready, attached network resources, e.g., routing rules, network rules, table rules, DNS servers, etc. may be removed. The application namespace creation script may revert the namespace creation rules and remove the application network namespace.

In configurations, if the application network namespace has not been created, or once the application network namespace has been removed, then the container is configured, by the container management tool, to operate in a desired network mode. For example, the container may operate in a host mode or a bridge mode. The host network mode generally is the most basic network mode. The bridge network mode allows a user to use a virtual network bridge to create a layer between the host and the networking of the container. Other types of network modes exist and may be used with the techniques and architecture described herein.

In configurations, the container management tool creates a software generated namespace once the container management tool has been initialized. The container management tool locates the software generated namespace. The container management tool removes any resources associated with the software generated namespace, as well as any rules, DNS servers, etc.

In configurations, the container management tool creates a link to a desired application network namespace name, e.g., a desired or existing (e.g., pre-existing) application namespace, within the software generated namespace. The application namespace creation script creates the namespace name within the container management service.

In configurations, the container is now operating within the desired, e.g., existing, application network namespace. The container operates within the desired application namespace by accessing the software generated namespace that includes the link to the desired, e.g., existing, application network namespace. As previously noted, the software generated namespace has been cleared of attached resources and components and now only contains the link to the desired or existing application network namespace. Thus, the container executes applications within the desired or existing application network namespace by following the link to the desired or existing application network namespace.

In configurations, additional applications in containers may operate within the desired or existing application network namespace. For example, the container management tool 108 may be initialized to produce a second container. The container management tool 108 may then determine if the software generated namespace has been created. If not, then the container management tool may wait for the generated namespace to be created as previously described. Once the software generated namespace has been created as previously described, then the second application container may be associated with the software generated namespace generated by the container management tool. The second application container may thus access the software generated namespace and follow the link to the desired or existing application network namespace. Thus, this second container may operate within the desired or existing application network namespace.

As an example, a method may include, based at least in part on non-existence of an application network namespace, operating, by a container management tool of a container management service of a service provider network, a first container in a network mode associated with a software generated namespace generated by the container management tool. The method may also include determining, by the container management tool, a location of the software generated namespace. The method may further include providing, by the container management tool a link to a desired application network namespace to the software generated namespace. The method may also include generating, by the container management tool using an application namespace creation script, a name for the desired application network namespace. The method may further include executing by the service provider network, one or more first applications in the first container, where executing the one or more first applications in the first container comprises the first container accessing the software generated namespace and following the link to the desired application network namespace.

In configurations, the method may further include initializing, by the container management service the container management tool to produce the first container, where initializing the container management tool comprises producing internet protocol (IP) table rules and routing rules related to the first container.

In configurations, the method may also include removing, by the container management tool, the IP table rules and the routing rules related to the first container.

In configurations, the method may further include removing, by the container management tool, components of the software generated namespace, where the components comprise the IP table rules, the routing rules, and an identity of a domain name server (DNS) server.

In configurations, the method may also include based on existence of the application network namespace, determining, by the container management tool whether an application namespace creation script is available. The method may further include based on the application namespace creation script being available, removing, by the container management tool, network resources of the service provider network attached to the application network namespace. The method may also include reversing, by the container management tool, container creation rules and removing, by the container management tool, the application network namespace from the service provider network. In such configurations, the container creation rules may comprise IP table rules, routing rules, and an identity of a DNS server.

In configurations, the method may further include based at least in part on the application namespace creation script being unavailable, generating, by the container management tool, the application namespace creation script.

In configurations, the method may also include initializing, by the container management tool, a second container for association with the desired application network namespace. The method may also include operating, by the container management tool, the second container in the network mode associated with the software generated namespace generated by the container management tool. The method may also include executing, by the service provider network, one or more second applications in the second container, wherein executing the one or more second applications in the second container comprises the second container accessing the software generated namespace and following the link to the desired application network namespace.

In configurations, the method may further include determining, by the container management tool, nonexistence of the software generated namespace. In such configurations, the method may also include executing, by the service provider network, the one or more second applications in the second container after generation of the software generated namespace.

Accordingly, a container management tool of a container management service of a service provider network may be initialized. The initialization results in creation of a container. The initialization may also result in creation of network pieces such as, for example, IP table rules, routing rules, identity of a DNS server, etc. The container management tool may remove these network pieces as they might interfere with the process of operating a container or containers inside existing network namespaces in the service provider network. The container management tool may generate or locate a software generated namespace called Alpha. The container management tool may remove attached resources and components from Alpha. The container management tool may add a link to a desired or existing application network namespace named Beta to the software generated namespace called Alpha. The container management tool may use an application namespace creation script to create the name Beta for the desired or existing application network namespace. When applications are executed in the container, the container uses the link in Alpha to operate within Beta.

Thus, the techniques and architecture described herein provide a method for utilizing an existing application network namespace for executing an application within a container. The techniques and architecture provide for a container management tool that generates a software generated namespace. The software generated namespace has any components and resources attached thereto removed. The container management tool provides a link, within the software generated namespace, to a desired or pre-existing application network namespace. A container then accesses the software generated namespace and follows the link to the desired or pre-existing application network namespace. Thus, the desired or pre-existing application network namespace does not need to be recreated for new applications and/or containers executing therein. This saves time and computing resources. Computing cycles may be saved due to the lack of needing to recreate large amounts of code in order to recreate the desired or pre-existing namespace.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a system-architecture diagram of an example service provider network 100. The service provider network 100 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 100 may be distributed across one or more physical or virtual devices.

As may be seen in FIG. 1, the service provider network 100 includes storage services 102 and computing services 104 that are provided by the service provider network 100. As is known, in configurations, other types of services may also be provided by the service provider network 100. The storage services 102 and computing services 104, as well as any other services, may be provided to businesses or individuals.

In configurations, the service provider network 100 includes container management service 106. The container management service 106 includes a container management tool 108 that includes an application namespace creation script 110.

In configurations, a user 112 accesses the service provider network 100 using a client device 114. The user 112 may thus obtain computing services 102 and storage services 104, as well as other services, from the service provider network 100, using the client device 114. As an example, the user 112 may utilize the user device 114 to obtain computing resources from the computing service 104. The user 112 may define one or more applications 116 that execute within a container 118 that operates within a desired or existing application network namespace 120 of the computing services 104 of the service provider network 100.

In configurations, for operating the container 118 or containers inside the existing network namespace 120, the container management tool 108 of the container management service 106 is initialized thereby creating the container 118. During initialization, routing rules, network rules, table rules, etc. may be created for the container 118. In configurations, these network pieces may interfere with the process of having the container operate within the desired or existing network namespace 120. Thus, in configurations, these potentially interfering network pieces introduced by the container management tool 108 may be removed from the container 118.

In configurations, the container management tool 108 determines if an application network namespace 122 has been created. This application network namespace 122 may be created upon activation, for example, of the server of the container management service 106 executing the container management tool 108. As is known, a network namespace has an independent network stack, e.g., its own private routing table, set of Internet Protocol (IP) addresses, socket listing, connection tracking table, firewall, and other network-related resources. Upon activation of this server, such an application network namespace may be created by the server. If this application network namespace 122 has been created, the container management tool 108 may determine if the application namespace creation script 110 is ready. If the application namespace creation script 110 is not ready, then the container management tool 108 may generate the application namespace creation script 110. When the application namespace creation script 110 is ready, attached network resources, e.g., routing rules, network rules, table rules, DNS servers, etc. may be removed. The application namespace creation script 110 may revert the namespace creation rules and remove the application network namespace 122.

In configurations, if the application network namespace 122 has not been created, or once the application network namespace 122 has been removed, then the container 118 is configured, by the container management tool 108, to operate in a desired network mode. For example, the container 118 may operate in a host mode or a bridge mode. The host network mode generally is the most basic network mode. The bridge network mode allows a user to use a virtual network bridge to create a layer between the host and the networking of the container. Other types of network modes exist and may be used with the techniques and architecture described herein.

In configurations, the container management tool 108 creates a software generated namespace 124 once the container management tool 108 has been initialized. Once the container 118 is operating in the desired network mode, the container management tool 108 locates the software generated namespace 124. The container management tool 108 removes any resources associated with the software generated namespace 124, as well as any rules, DNS servers, etc.

In configurations, the container management tool 108 provides, e.g., creates or generates, a link 126 to the desired application network namespace name 120, e.g., a desired or existing (e.g., pre-existing) application namespace, within the software generated namespace 124. The application namespace creation script 110 creates the namespace name within the container management service 106.

In configurations, the container 118 is now operating within the desired, e.g., existing, application network namespace 120. The container 118 operates within the desired application namespace by accessing the software generated namespace 124 that includes the link 126 to the desired, e.g., existing, application network namespace 120. As previously noted, the software generated namespace 124 has been cleared of attached resources and components and now only contains the link 126 to the desired or existing application network namespace 120. Thus, the container 118 executes applications within the desired or existing application network namespace 120 by following the link 126 to the desired or existing application network namespace 120.

In configurations, additional applications in containers may operate within the desired or existing application network namespace. For example, the container management tool 108 may be initialized to produce a second container 128. The container management tool 108 may then determine if the software generated namespace 124 has been created. If not, then the container management tool 108 may wait for the generated namespace 124 to be created as previously described. Once the software generated namespace 124 has been created as previously described, then the second application container 128 may be associated with the software generated namespace 124 generated by the container management tool 108. The second application container 128 may thus access the software generated namespace 124 and follow the link 126 to the desired or existing application network namespace 120. Thus, this second container 128 may operate within the desired or existing application network namespace 120 and execute applications 130.

Figure 2A:
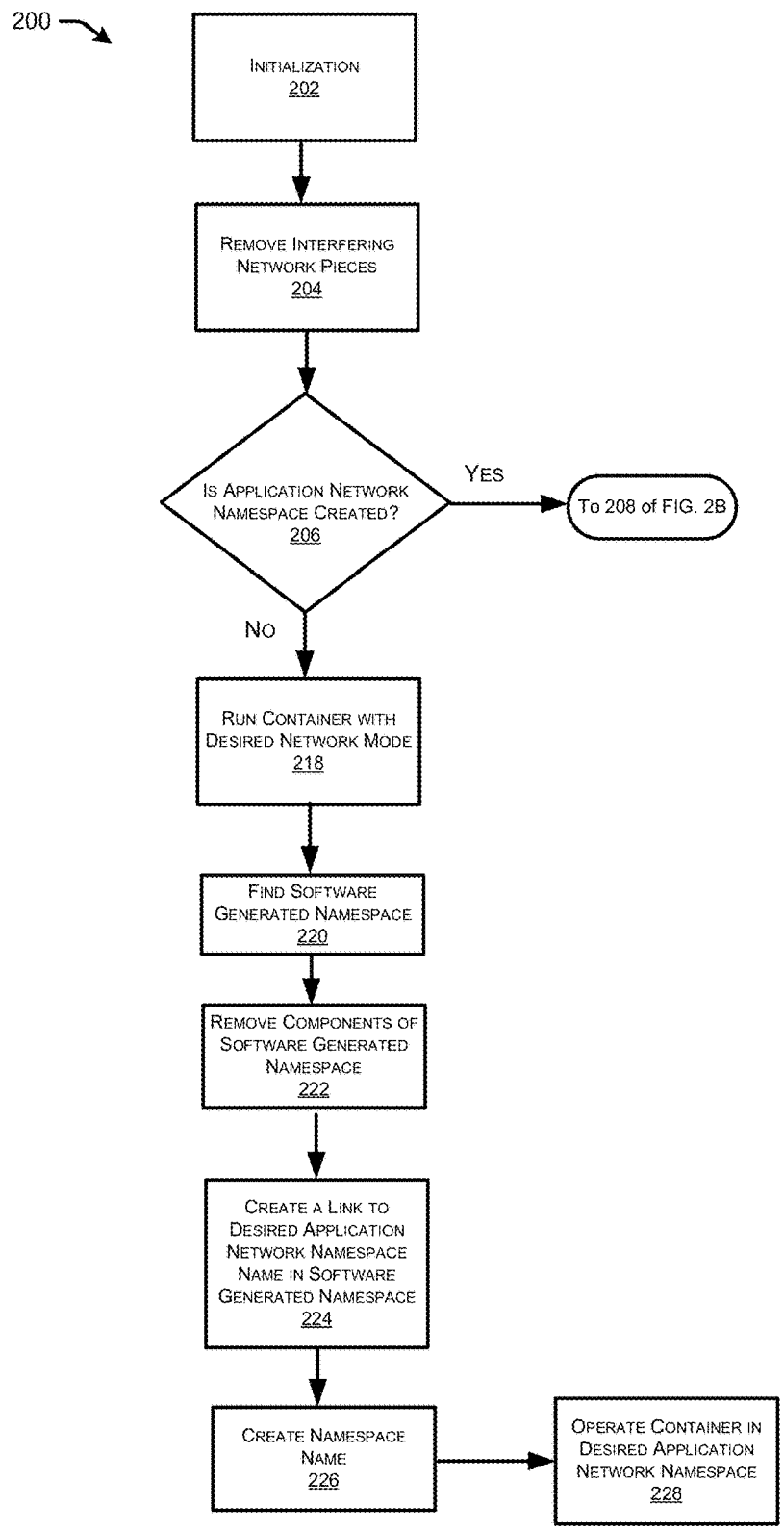
FIGS. 2A and 2B schematically illustrate an example flow for operating a container inside an existing network namespace in the example service provider network of FIG. 1.
Figure 2B:
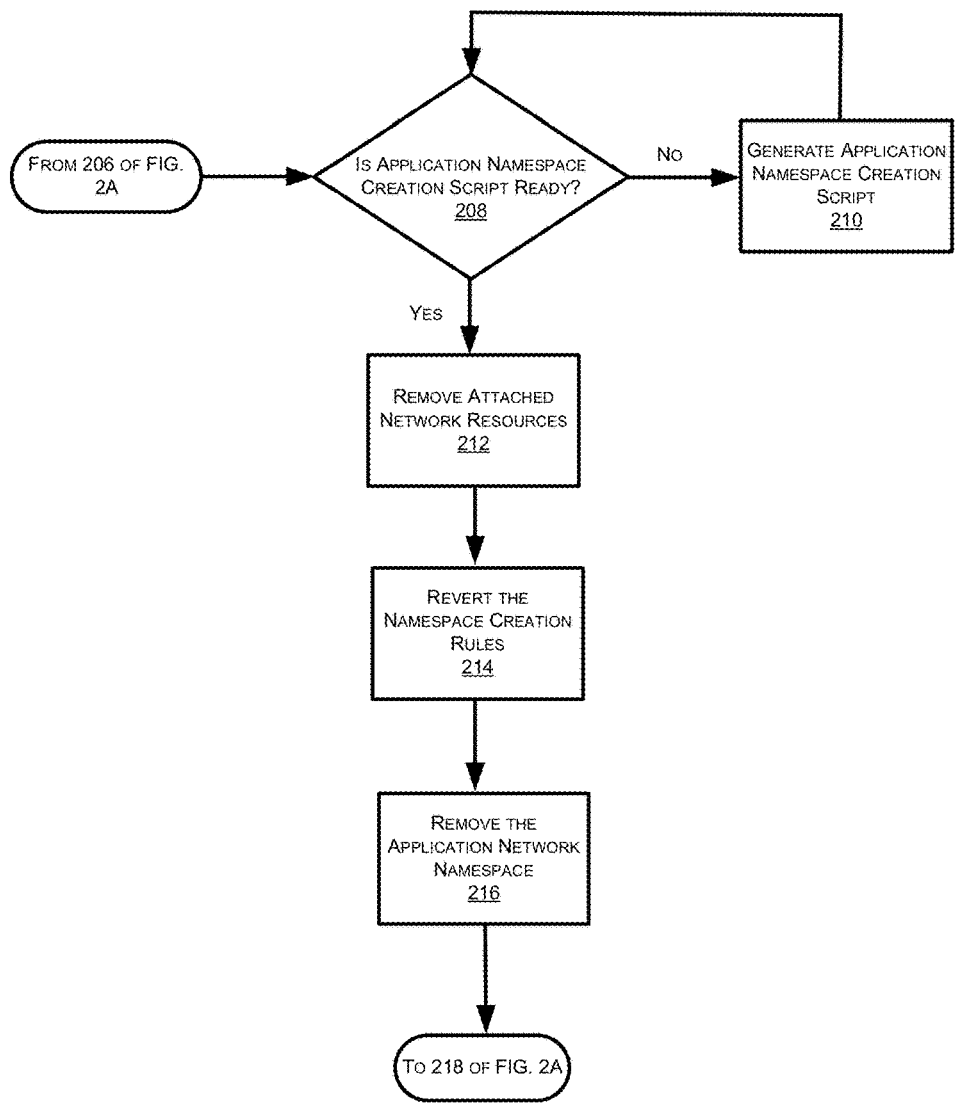

FIGS. 2A and 2B schematically illustrate an example flow 200 for operating a container inside an existing network namespace, e.g., desired or existing application network namespace 120, in accordance with configurations described herein. At 202, a container management tool, e.g., the container management tool 108 of the container management service 106, is initialized thereby creating a container, e.g., the container 118. During initialization, routing rules, network rules, table rules, etc. may be created for the container 118. In configurations, these network pieces may interfere with the process of having the container operate within the desired or existing network namespace 120. Thus, in configurations, at 204 these potentially interfering network pieces introduced by the container management tool 108 may be removed from the container 118.

In configurations, at 206 the container management tool 108 determines if an application network namespace 122 has been created. This application network namespace 122 may be created upon activation, for example, of the server of the container management service 106 executing the container management tool 108. As is known, a network namespace has an independent network stack, e.g., its own private routing table, set of Internet Protocol (IP) addresses, socket listing, connection tracking table, firewall, and other network-related resources. Upon activation of this server, such an application network namespace may be created by the server.

If this application network namespace 122 has been created, at 208 of FIG. 2B the container management tool 108 determines if the application namespace creation script 110 is ready. If the application namespace creation script 110 is not ready, then at 210 the container management tool 108 may generate the application namespace creation script 110. When the application namespace creation script 110 is ready, at 212 attached network resources, e.g., routing rules, network rules, table rules, DNS servers, etc. are removed. At 214, the application namespace creation script 110 reverts the namespace creation rules. At 216, the application namespace creation script 110 removes the application network namespace 122. The flow 200 then proceeds to 218 of FIG. 2A.

In configurations, if the application network namespace 122 has not been created, or once the application network namespace 122 has been removed, at 218 the container 118 is configured, by the container management tool 108, to operate in a desired network mode. For example, the container 118 may operate in a host mode or a bridge mode. The host network mode generally is the most basic network mode. The bridge network mode allows a user to use a virtual network bridge to create a layer between the host and the networking of the container. Other types of network modes exist and may be used with the techniques and architecture described herein.

In configurations, the container management tool 108 creates a software generated namespace 124 once the container management tool 108 has been initialized. Once the container 118 is operating in the desired network mode, at 220 the container management tool 108 locates the software generated namespace 124. At 222, the container management tool 108 removes any resources associated with the software generated namespace 124, as well as any rules, DNS servers, etc.

In configurations, at 224 the container management tool 108 provides, e.g., creates or generates a link 126 to the desired application network namespace name 120, e.g., a desired or existing (e.g., pre-existing) application namespace, within the software generated namespace 124. At 226, the application namespace creation script 110 creates the namespace name within the container management service 106.

In configurations, at 228 the container 118 is now operating within the desired, e.g., existing, application network namespace 120. The container 118 operates within the desired application namespace by accessing the software generated namespace 124 that includes the link 126 to the desired, e.g., existing, application network namespace 120. As previously noted, the software generated namespace 124 has been cleared of attached resources and components and now only contains the link 126 to the desired or existing application network namespace 120. Thus, the container 118 executes applications within the desired or existing application network namespace 120 by following the link 126 to the desired or existing application network namespace 120.

Figure 3:
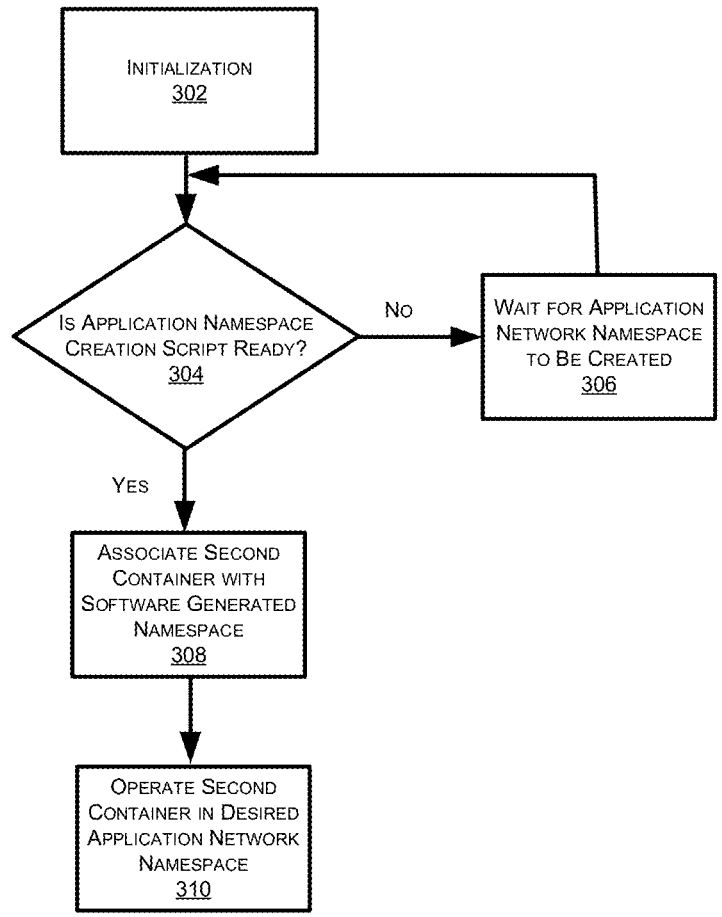
FIG. 3 schematically illustrates an example flow for operating multiple containers inside an existing network namespace in the example service provider network of FIG. 1.

Referring to FIG. 3, as previously noted, in configurations, additional applications in containers may operate within the desired or existing application network namespace. FIG. 3 schematically illustrates an example flow 300 for operating multiple containers inside an existing network namespace, e.g., desired or existing application network namespace 120, in accordance with configurations described herein. For example, at 302 the container management tool 108 may be initialized to produce a second container 128. At 304, the container management tool 108 may then determine if the software generated namespace 124 has been created. If not, then at 306 the container management tool 108 may wait for the generated namespace 124 to be created as previously described. Once the software generated namespace 124 has been created as previously described, then at 308 the second application container 128 may be associated with the software generated namespace 124 generated by the container management tool 108. The second application container 128 may thus access the software generated namespace 124 and follow the link 126 to the desired or existing application network namespace 120. Thus, at 310 this second container 128 may operate within the desired or existing application network namespace 120.

Figure 4:
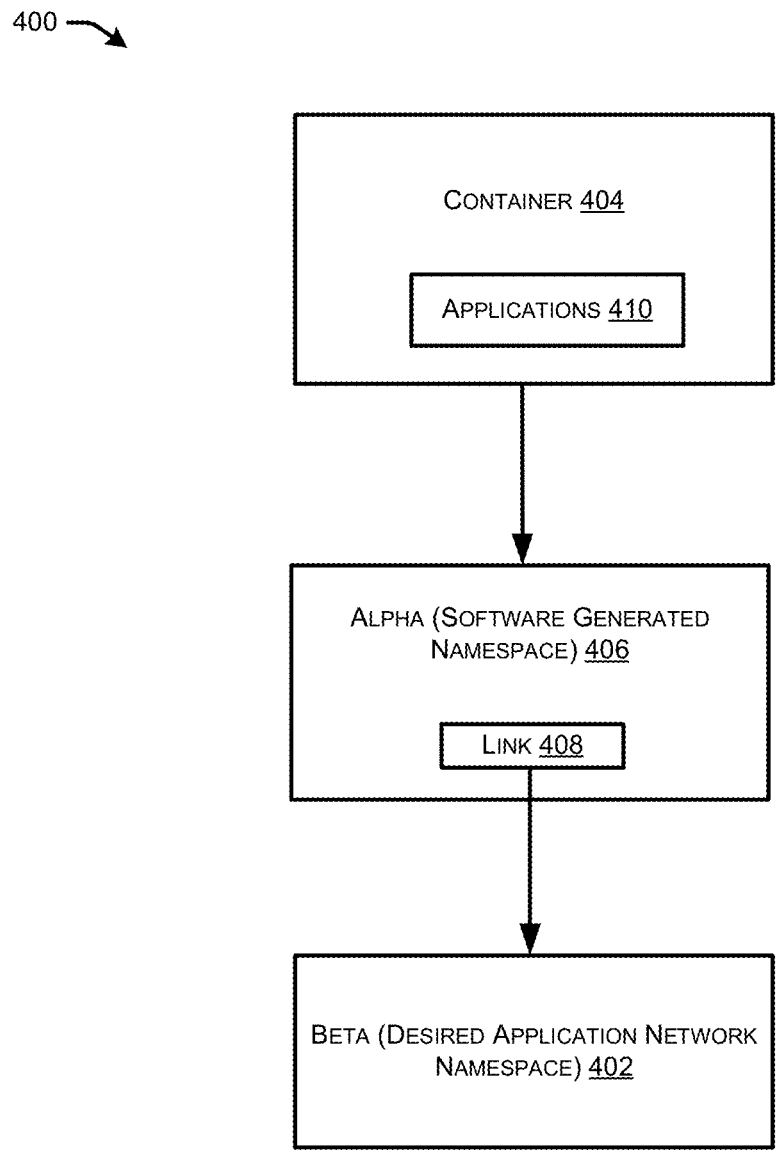
FIG. 4 schematically illustrates an example arrangement of operating a container inside an existing network namespace in the example service provider network of FIG. 1.

FIG. 4 schematically illustrates an example arrangement 400 of operating a container inside an existing network namespace 402, e.g., desired or existing application network namespace 120, in accordance with configurations described herein. A container management tool, e.g., container management tool 108, of a container management service, e.g., container management service 106, of a service provider network, e.g., service provider network 100, may be initialized, which results in creation of a container 404. The initialization may also result in creation of network pieces such as, for example, IP table rules, routing rules, identity of a DNS server, etc. The container management tool may remove these network pieces as they might interfere with the process of operating the container 404 (and other containers) inside existing network namespaces in the service provider network.

The container management tool may generate and/or locate a software generated namespace 406 called Alpha. The container management tool may remove attached resources and components from software generated namespace 406. The container management tool may add a link 408 to the desired or existing application network namespace 402 named Beta to the software generated namespace 406 called Alpha. The container management tool may use an application namespace creation script to create the name Beta for the desired or existing application network namespace 402. Thus, when applications 410 are executed in the container 404, the container 404 uses the link 408 in Alpha to operate within Beta.

Figure 5:
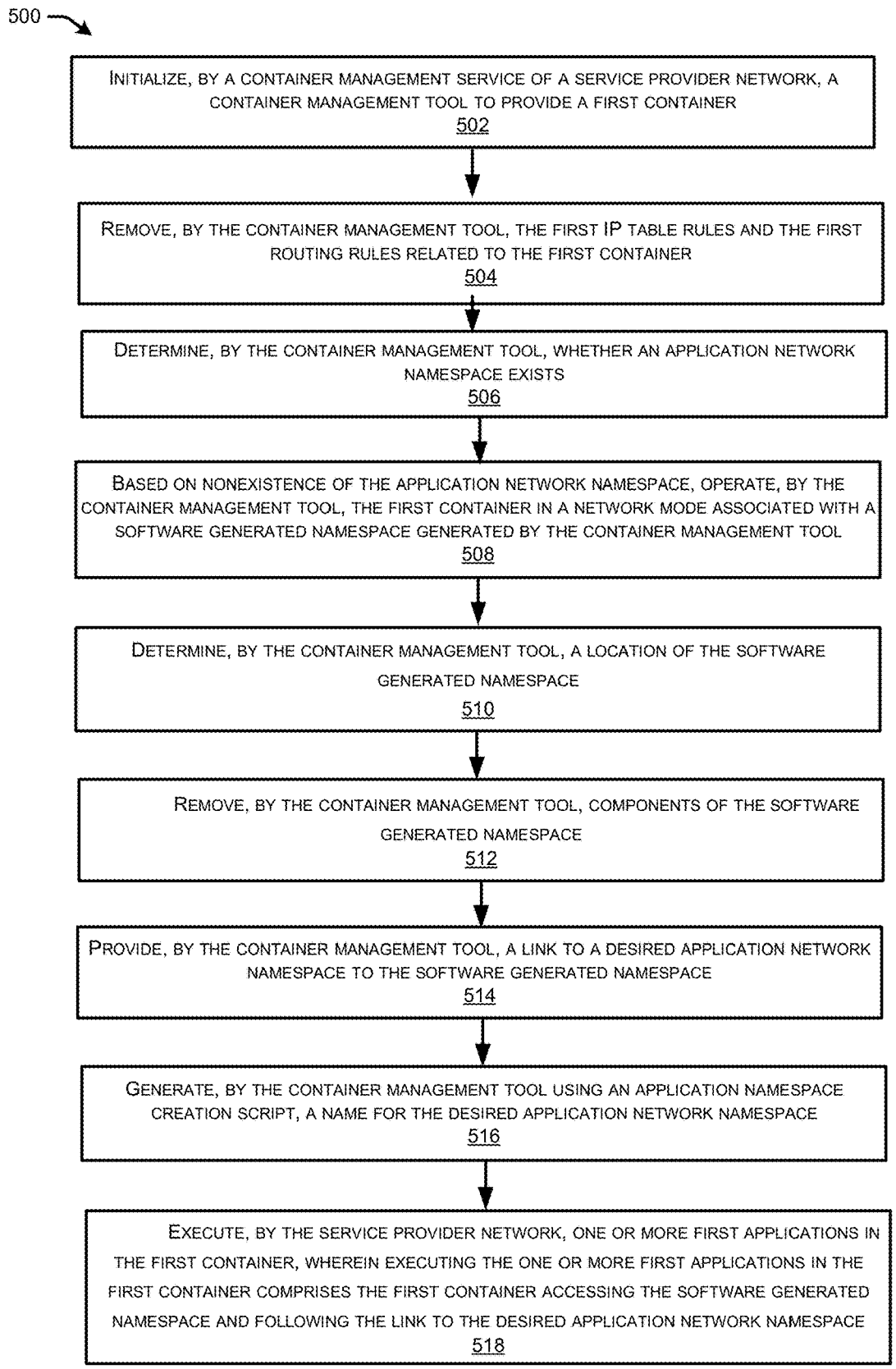
FIG. 5 is a flow diagram of an example method for operating a container inside an existing network namespace in the example service provider network of FIG. 1.

FIG. 5 illustrates an example flow diagram of example method 500 that illustrates aspects of the functions performed at least partly by the services as described in FIGS. 1, 2A, 2B, 3, and 4. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of the example method 500 for operating a container inside an existing network namespace, e.g., desired or existing application network namespace 120. At 502, a container management service of a service provider network initializes a container management tool to provide a first container, wherein initializing the container management tool comprises producing first internet protocol (IP) table rules and first routing rules related to the first container. For example, the container management tool 108 of the container management service 106 is initialized thereby creating a container, e.g., the container 118. During initialization, routing rules, network rules, table rules, etc. may be created for the container 118. In configurations, these network pieces may interfere with the process of having the container operate within the desired or existing network namespace 120. Thus, in configurations, at 204 these potentially interfering network pieces introduced by the container management tool 108 may be removed from the container 118.

At 504, the container management tool removes the first IP table rules and the first routing rules related to the first container. For example, since the network pieces may interfere with the process of having the container operate within the desired or existing network namespace 120, these potentially interfering network pieces introduced by the container management tool 108 may be removed from the container 118.

At 506, the container management tool determines whether an application network namespace exists. For example, the container management tool 108 determines if an application network namespace 122 has been created.

This application network namespace 122 may be created upon activation, for example, of the server of the container management service 106 executing the container management tool 108. As is known, a network namespace has an independent network stack, e.g., its own private routing table, set of Internet Protocol (IP) addresses, socket listing, connection tracking table, firewall, and other network-related resources. Upon activation of this server, such an application network namespace may be created by the server.

In configurations, at 228 the container 118 is now operating within the desired, e.g., existing, application network namespace 120. The container 118 operates within the desired application namespace by accessing the software generated namespace 124 that includes the link 126 to the desired, e.g., existing, application network namespace 120. As previously noted, the software generated namespace 124 has been cleared of attached resources and components and now only contains the link 126 to the desired or existing application network namespace 120. Thus, the container 118 executes applications within the desired or existing application network namespace 120 by following the link 126 to the desired or existing application network namespace 120.

At 508, based on nonexistence of the application network namespace, the container management tool operates the first container in a network mode associated with a software generated namespace generated by the container management tool. For example, if the application network namespace 122 has not been created, or once the application network namespace 122 has been removed, the container 118 is configured, by the container management tool 108, to operate in a desired network mode. For example, the container 118 may operate in a host mode or a bridge mode. The host network mode generally is the most basic network mode. The bridge network mode allows a user to use a virtual network bridge to create a layer between the host and the networking of the container. Other types of network modes exist and may be used with the techniques and architecture described herein. However, if this application network namespace 122 has been created, at 208 of FIG. 2B the container management tool 108 determines if the application namespace creation script 110 is ready. If the application namespace creation script 110 is not ready, the container management tool 108 may generate the application namespace creation script 110. When the application namespace creation script 110 is ready, attached network resources, e.g., routing rules, network rules, table rules, DNS servers, etc. are removed. The application namespace creation script 110 reverts the namespace creation rules. The application namespace creation script 110 removes the application network namespace 122.

At 510, the container management tool determines a location of the software generated namespace. For example, in configurations, the container management tool 108 creates the software generated namespace 124 once the container management tool 108 has been initialized. Once the container 118 is operating in the desired network mode, the container management tool 108 locates the software generated namespace 124.

At 512, the container management tool removes components of the software generated namespace, wherein the components comprise second IP table rules, second routing rules, and an identity of a domain name server (DNS) server. For example, the container management tool 108 removes any resources associated with the software generated namespace 124, as well as any rules, DNS servers, etc.

At 514, the container management tool provides a link to a desired application network namespace to the software generated namespace. For example, in configurations, the container management tool 108 provides, e.g., creates or generates a link 126 to the desired application network namespace name 120, e.g., a desired or existing (e.g., pre-existing) application namespace, within the software generated namespace 124.

At 516, the container management tool uses an application namespace creation script to generate a name for the desired application network namespace. For example, the application namespace creation script 110 creates the namespace name within the container management service 106.

At 518, the service provider network executes one or more first applications in the first container, wherein executing the one or more first applications in the first container comprises the first container accessing the software generated namespace and following the link to the desired application network namespace. For example, in configurations, the container 118 is now operating within the desired, e.g., existing, application network namespace 120. The container 118 operates within the desired application namespace by accessing the software generated namespace 124 that includes the link 126 to the desired, e.g., existing, application network namespace 120. As previously noted, the software generated namespace 124 has been cleared of attached resources and components and now only contains the link 126 to the desired or existing application network namespace 120. Thus, the container 118 executes applications within the desired or existing application network namespace 120 by following the link 126 to the desired or existing application network namespace 120.

As previously noted, in configurations, additional applications in containers may operate within the desired or existing application network namespace, e.g., desired or existing application network namespace 120. For example, the container management tool 108 may be initialized to produce a second container 128. The container management tool 108 may then determine if the software generated namespace 124 has been created. If not, then the container management tool 108 may wait for the generated namespace 124 to be created as previously described. Once the software generated namespace 124 has been created as previously described, then the second application container 128 may be associated with the software generated namespace 124 generated by the container management tool 108. The second application container 128 may thus access the software generated namespace 124 and follow the link 126 to the desired or existing application network namespace 120. Thus, this second container 128 may operate within the desired or existing application network namespace 120.

Accordingly, the techniques and architecture described herein provide a method for utilizing an existing application network namespace for executing an application within a container. The techniques and architecture provide for a container management tool that generates a software generated namespace. The software generated namespace has any components and resources attached thereto removed. The container management tool places a link, within the software generated namespace, to a desired or pre-existing application network namespace. A container then accesses the software generated namespace and follows the link to the desired or pre-existing application network namespace. Thus, the desired or pre-existing application network namespace does not need to be recreated for new applications and/or containers executing therein. This saves time and computing resources. Computing cycles may be saved due to the lack of needing to recreate large amounts of code in order to recreate the desired or pre-existing namespace.

Figure 6:
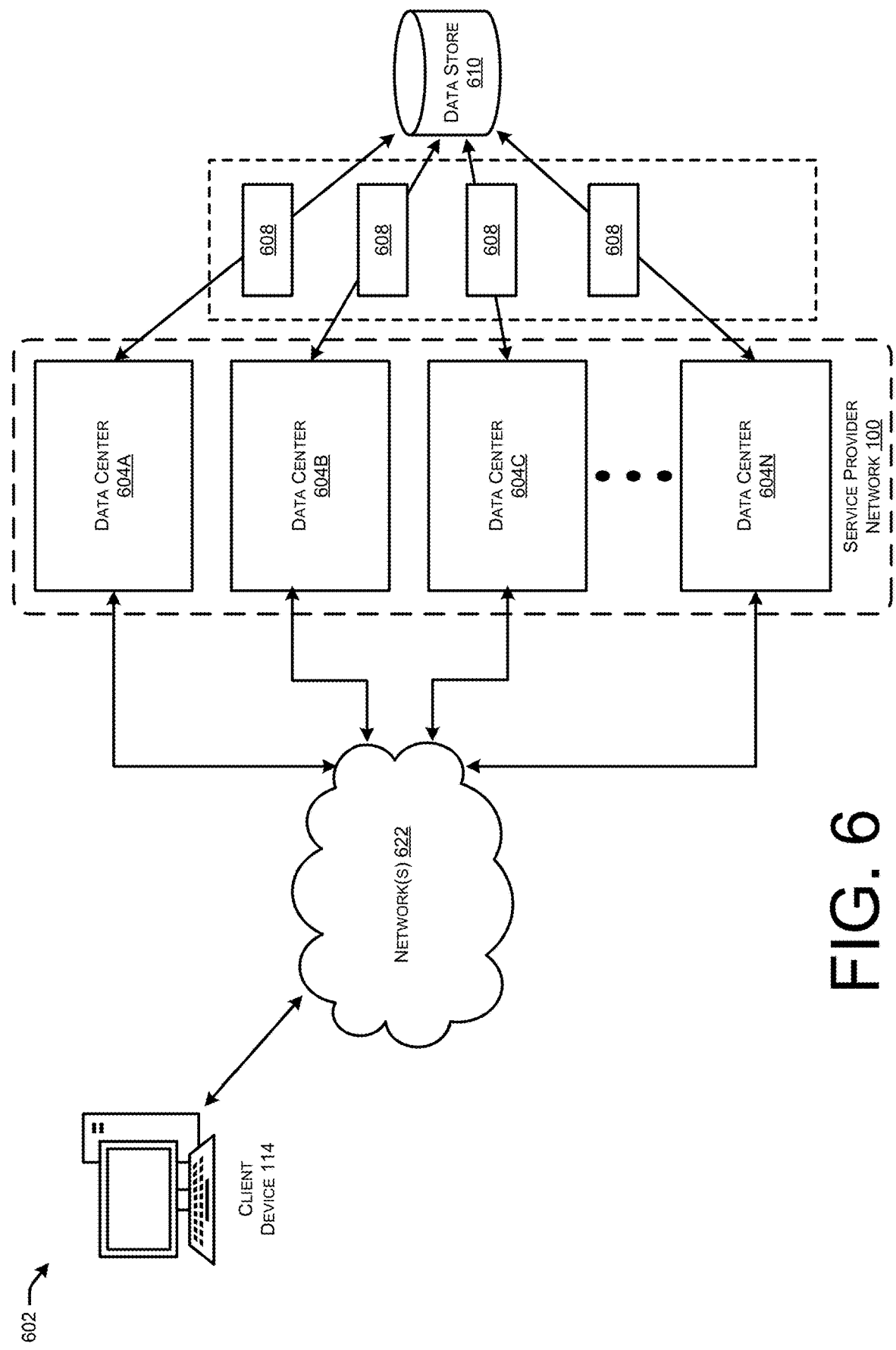
FIG. 6 is a system and network diagram that shows an illustrative operating environment that includes a service provider network that can be configured to implement aspects of the functionality described herein.

FIG. 6 is a system and network diagram that shows one illustrative operating environment 600 for the configurations disclosed herein that includes a service provider network 100 that can be configured to perform the techniques disclosed herein and which may be accessed by a computing device 602. The service provider network 100 can provide computing resources, like virtual machine (VM) or instances (VM instances herein) and storage, on a permanent or an as-needed basis. Among other types of functionality, the computing resources provided by the service provider network 100 may be utilized to implement the various services described above such as, for example, the container management service 106.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 100 may be enabled in one embodiment by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 6.

The data centers 604 may be configured in different arrangements depending on the service provider network 100. For example, one or more data centers 604 may be included in or otherwise make-up an availability zone. Further, one or more availability zones may make-up or be included in a region. Thus, the service provider network 100 may comprise one or more availability zones, one or more regions, and so forth. The regions may be based on geographic areas, such as being located within a predetermined geographic perimeter.

Users of the service provider network 100 may access the computing resources provided by the service provider network 100 over any wired and/or wireless network(s) 622, which can be a wide area communication network ("WAN"), such as the Internet, an intranet or an Internet service provider ("ISP") network or a combination of such networks. For example, and without limitation, a computing device, e.g., computing device 602, operated by a user of the service provider network 100 may be utilized to access the service provider network 100 by way of the network(s) 622. It should be appreciated that a local-area network ("LAN"), the Internet, or any other networking topology known in the art that connects the data centers 604 to remote customers and other users can be utilized. It should also be appreciated that combinations of such networks can also be utilized.

Each of the data centers 604 may include computing devices that include software, such as applications that receive and transmit data 608. For instance, the computing devices included in the data centers 604 may include software components which transmit, retrieve, receive, or otherwise provide or obtain the data 608 from a data store 610. For example, the data centers 604 may include or store the data store 610, which may include the data 608.

Figure 7:
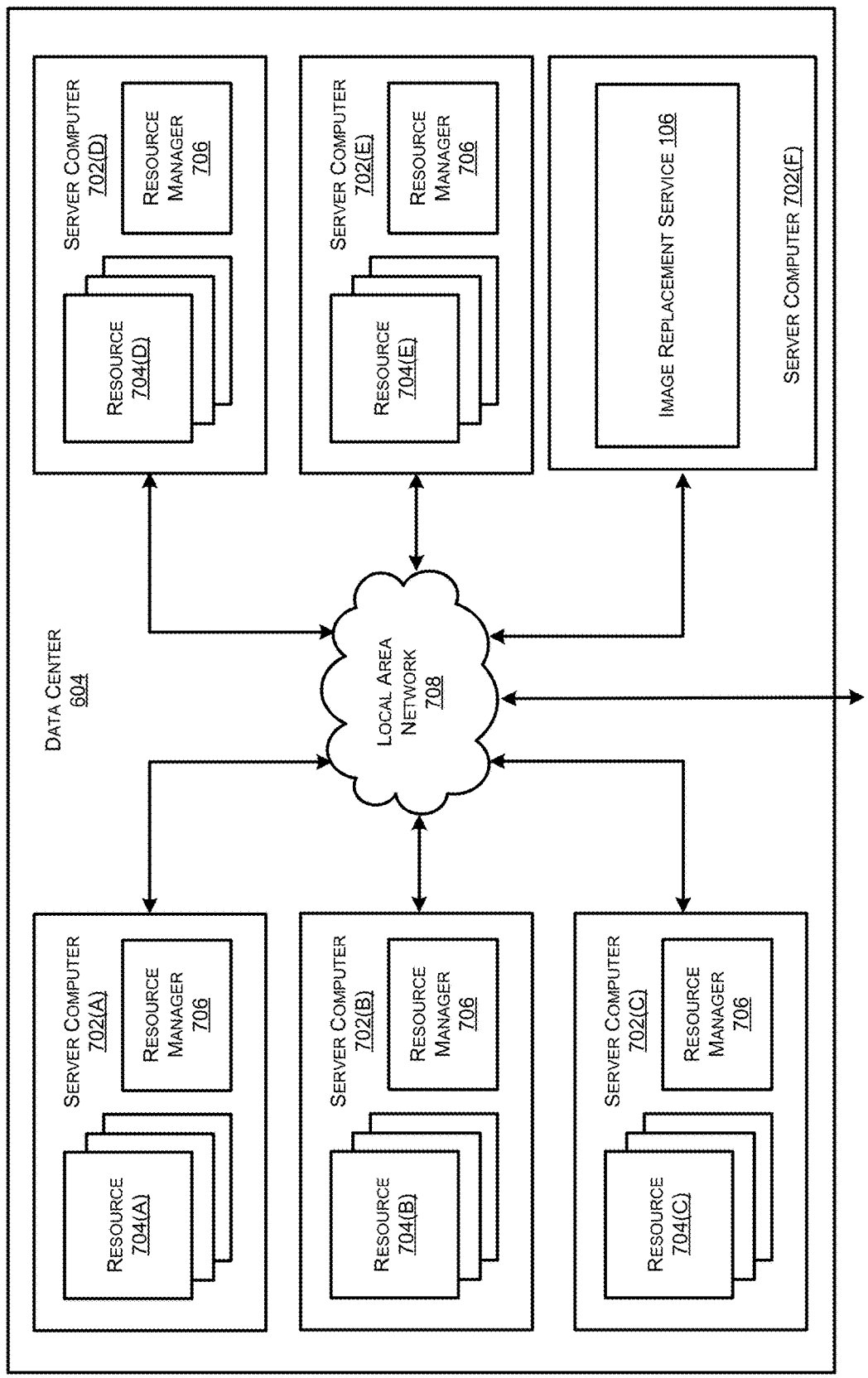
FIG. 7 is a computing system diagram illustrating a configuration for a data center that can be utilized to implement aspects of the technologies disclosed herein.

FIG. 7 is a computing system diagram that illustrates one configuration for a data center 604 that implements aspects of the technologies disclosed herein. The example data center 604 shown in FIG. 7 includes several server computers 702A-702F (which might be referred to herein singularly as "a server computer 702" or in the plural as "the server computers 702") for providing computing resources 704A-704E.

The server computers 702 can be standard tower, rack-mount, or blade server computers configured appropriately for providing the computing resources described herein (illustrated in FIG. 7 as the computing resources 704A-704E). As mentioned above, the computing resources provided by the service provider network 100 can be data processing resources such as VM instances or hardware computing systems, database clusters, computing clusters, storage clusters, data storage resources, database resources, networking resources, and others. Some of the server computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 604 can also be configured to provide network services and other types of services, some of which are described in detail below with regard to FIG. 6.

The data center 604 shown in FIG. 7 also includes a server computer 702F that can execute some or all of the software components described above. For example, and without limitation, the server computer 702F can be configured to execute components of the service provider network 100, including the instance replacement service 106, and/or the other software components described above. The server computer 702F can also be configured to execute other components and/or to store data for providing some or all of the functionality described herein. In this regard, it should be appreciated that the services illustrated in FIG. 7 as executing on the server computer 702F can execute on many other physical or virtual servers in the data centers 604 in various embodiments.

In the example data center 604 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604N, between each of the server computers 702A-702F in each data center 604, and, potentially, between computing resources in each of the server computers 702. It should be appreciated that the configuration of the data center 604 described with reference to FIG. 7 is merely illustrative and that other implementations can be utilized.

Figure 8:
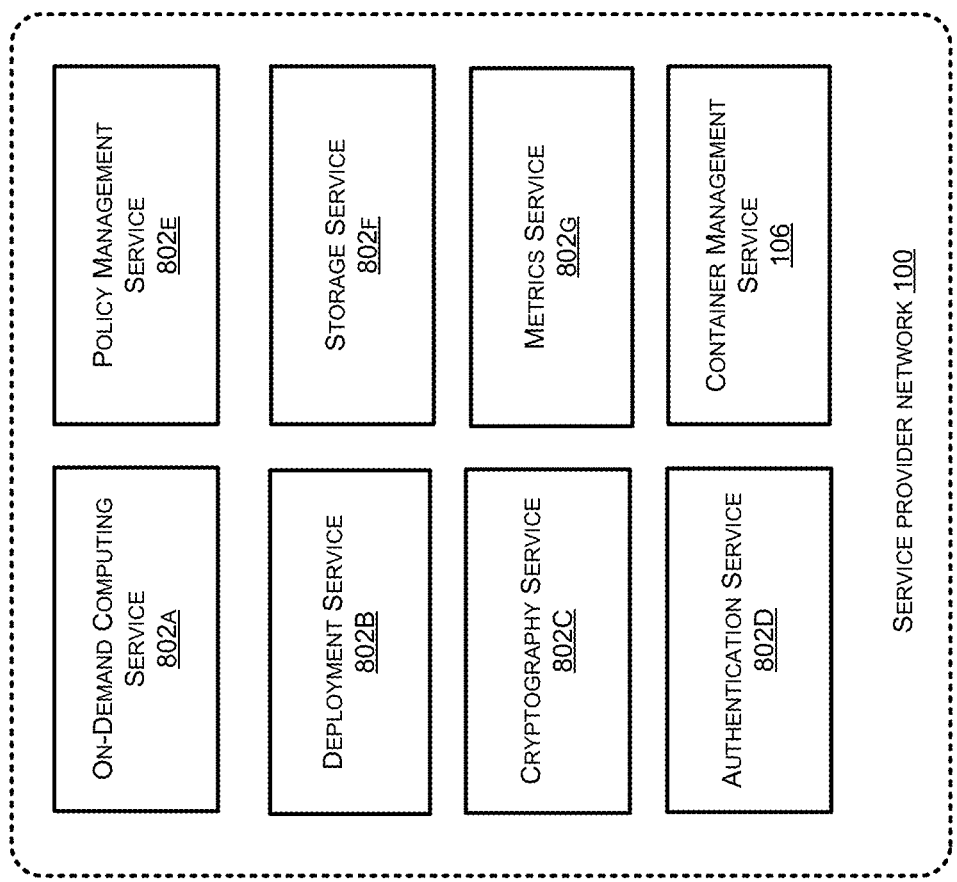
FIG. 8 is a network services diagram that shows aspects of several services that can be provided by and utilized within a system, or a larger system of which the system is a part, which is configured to implement the various technologies disclosed herein.

FIG. 8 is a system and network diagram that shows aspects of several network services that can be provided by and utilized within a service provider network 100 in one embodiment disclosed herein. In particular, and as discussed above, the service provider network 100 can provide a variety of network services to users within the service provider network 100, as well as customers, including, but not limited to, the container management service 106. The service provider network 100 can also provide other types of services including, but not limited to, an on-demand computing service 802A (e.g., computing services 104), a deployment service 802B, a cryptography service 802C, a storage service 802D (e.g., storage services 102), an authentication service 802E, and/or a policy management service 802G, some of which are described in greater detail below. Additionally, the service provider network 100 can also provide other services, some of which are also described in greater detail below:

It should be appreciated that customers of the service provider network 100 can include organizations or individuals that utilize some or all of the services provided by the service provider network 100. As described herein, a customer or other user can communicate with the service provider network 100 through a network, such as the network 822 shown in FIG. 8. Communications from a user computing device, such as the client device 114 shown in FIG. 1, to the service provider network 100 can cause the services provided by the service provider network 100 to operate in accordance with the described configurations or variations thereof.

It is noted that not all embodiments described include the services described with reference to FIG. 8 and that additional services can be provided in addition to or as an alternative to services explicitly described. Each of the services shown in FIG. 8 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 802A to store data in or retrieve data from a storage service). Additional details regarding some of the services shown in FIG. 8 will now be provided.

As discussed above, the on-demand computing service 802A (can be a collection of computing resources configured to instantiate VM instances and to provide other types of computing resources on demand. For example, a customer or other user of the service provider network 100 can interact with the on-demand computing service 802A (via appropriately configured and authenticated network services API calls) to provision and operate VM instances that are instantiated on physical computing devices hosted and operated by the service provider network 100.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 802A is shown in FIG. 8, any other computer system or computer system service can be utilized in the service provider network 100, such as a computer system or computer system service that does not employ virtualization and instead provisions computing resources on dedicated or shared computers/servers and/or other physical devices.

The service provider network 100 can also include a cryptography service 802C. The cryptography service 802C can utilize storage service 802F of the service provider network 100 to store encryption keys in encrypted form, whereby the keys are usable to decrypt customer keys accessible only to particular devices of the cryptography service 802C. The cryptography service 802C can also provide other types of functionality not specifically mentioned herein.

As illustrated in FIG. 8, the service provider network 100, in various embodiments, also includes an authentication service 802D and a policy management service 802E. The authentication service 802D, in one example, is a computer system (i.e., collection of computing resources) configured to perform operations involved in authentication of users. For instance, one of the services 802 shown in FIG. 8 can provide information from a user to the authentication service 802D to receive information in return that indicates whether or not the requests submitted by the user are authentic.

The policy management service 802E, in one example, is a network service configured to manage policies on behalf of customers or internal users of the service provider network 100. The policy management service 802E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services 802 based, at least in part, on the needs of its customers. For instance, the service provider network 100 can maintain a deployment service 802B for deploying program code and/or a data warehouse service in some embodiments. Other services can include object-level archival data storage services, database services, and services that manage, monitor, interact with, or support other services. The service provider network 100 can also be configured with other services not specifically mentioned herein in other embodiments.

Figure 9:
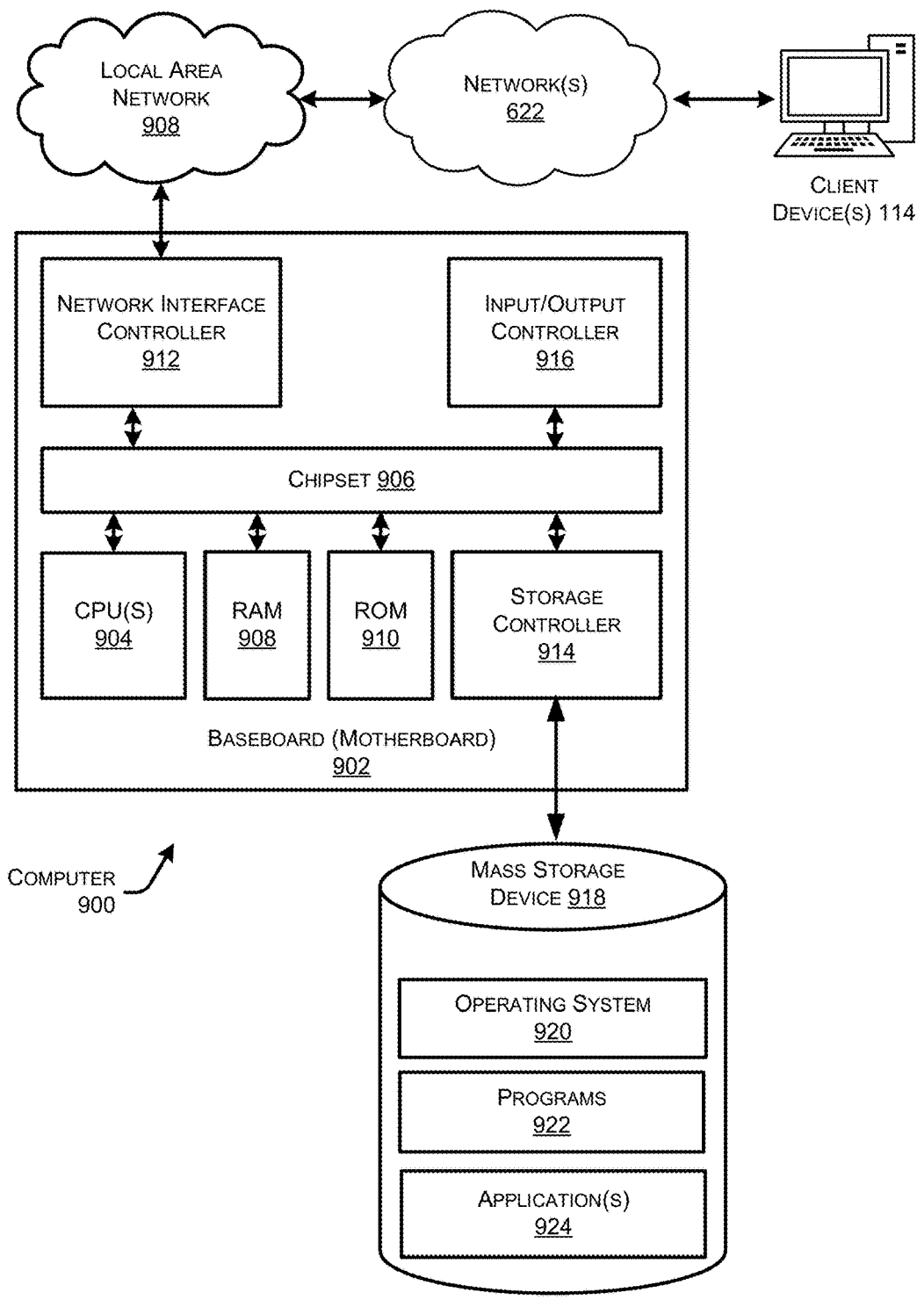
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote client device(s) 114, e.g., remote computing device(s) and computer systems through a network, such as the network 926. The chipset 906 can include functionality for providing network connectivity through a Network Interface Controller (NIC) 912, such as a gigabit Ethernet adapter. The NIC 912 is capable of connecting the computer 900 to other client device(s) 114, e.g., computing device(s), over the network 926 (or 622). It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922 (e.g., agents, etc.), data, and/or applications(s) 924, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the service provider network 100, and or any components included therein, may be supported by one or more devices similar to computer 900. Stated otherwise, some or all of the operations performed by the service provider network 100, and or any components included therein, may be performed by one or more computers 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 918 can store other system or application programs and data utilized by the computer 900.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-9. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may transmit, receive, retrieve, or otherwise provide and/or obtain data and/or results to and/or from the service provider network 100. The computer 900 may store the data on the operating system 920, and/or the programs 922 that are stored in the mass storage device 918 to update or otherwise modify the operating system 920 and/or the programs 922.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   initializing, by a container management service of a service provider network, a container management tool to provide a first container, wherein initializing the container management tool further comprises producing first internet protocol (IP) table rules and first routing rules related to the first container;
   removing, by the container management tool, the first IP table rules and the first routing rules related to the first container;
   determining, by the container management tool, whether an application network namespace exists, wherein the application network namespace comprises an independent network stack;
   based on nonexistence of the application network namespace, operating, by the container management tool, the first container in a network mode associated with a software generated namespace generated by the container management tool;
   determining, by the container management tool, a location of the software generated namespace;
   removing, by the container management tool, components of the software generated namespace, wherein the components comprise second IP table rules, second routing rules, and an identity of a first domain name server (DNS) server;
   providing, by the container management tool, a link to a desired application network namespace to the software generated namespace, wherein the desired application network namespace comprises a pre-existing application network namespace;
   generating, by the container management tool using an application namespace creation script, a name for the desired application network namespace; and
   executing, by the service provider network, one or more first applications in the first container, wherein executing the one or more first applications in the first container comprises the first container accessing the software generated namespace and following the link to the desired application network namespace.

2. The method of claim 1, further comprising:
   based on existence of the application network namespace, determining, by the container management tool, whether an application namespace creation script is available;
   based on the application namespace creation script being available, removing, by the container management tool, network resources of the service provider network attached to the application network namespace;
   reversing, by the container management tool, container creation rules, wherein the container creation rules comprise third IP table rules, third routing rules, and an identity of a second DNS server; and
   removing, by the container management tool, the application network namespace from the service provider network.

3. The method of claim 2, further comprising:
   based on the application namespace creation script being unavailable, generating, by the container management tool, the application namespace creation script.

4. The method of claim 1, further comprising:
   initializing, by the container management tool, a second container for association with the desired application network namespace;
   operating, by the container management tool, the second container in the network mode associated with the software generated namespace generated by the container management tool; and
   executing, by the service provider network, one or more second applications in the second container, wherein executing the one or more second applications in the second container comprises the second container accessing the software generated namespace and following the link to the desired application network namespace.

5. The method of claim 4, further comprising:
   determining, by the container management tool, nonexistence of the software generated namespace; and
   executing, by the service provider network, the one or more second applications in the second container after generation of the software generated namespace.

6. A method comprising:
   based at least in part on nonexistence of an application network namespace, operating, by a container management tool of a container management service of a service provider network, a first container in a network mode associated with a software generated namespace generated by the container management tool;
   determining, by the container management tool, a location of the software generated namespace;
   providing, by the container management tool, a link to a desired application network namespace to the software generated namespace;
   generating, by the container management tool using an application namespace creation script, a name for the desired application network namespace; and
   executing, by the service provider network, one or more first applications in the first container, wherein executing the one or more first applications in the first container comprises the first container accessing the software generated namespace and following the link to the desired application network namespace.

7. The method of claim 6, further comprising:
initializing, by the container management service, the container management tool to produce the first container, wherein initializing the container management tool further comprises producing internet protocol (IP) table rules and routing rules related to the first container.

8. The method of claim 7, further comprising:
removing, by the container management tool, the IP table rules and the routing rules related to the first container.

9. The method of claim 6, further comprising:
removing, by the container management tool, components of the software generated namespace, wherein the components comprise IP table rules, routing rules, and an identity of a domain name server (DNS) server.

10. The method of claim 6, further comprising:
based at least in part on existence of the application network namespace, determining, by the container management tool, whether an application namespace creation script is available;
based at least in part on the application namespace creation script being available, removing, by the container management tool, network resources of the service provider network attached to the application network namespace;
reversing, by the container management tool, container creation rules; and
removing, by the container management tool, the application network namespace from the service provider network.

11. The method of claim 10, wherein the container creation rules comprise IP table rules, routing rules, and an identity of a DNS server.

12. The method of claim 11, further comprising:
based at least in part on the application namespace creation script being unavailable, generating, by the container management tool, the application namespace creation script.

13. The method of claim 6, further comprising:
initializing, by the container management tool, a second container for association with the desired application network namespace;
operating, by the container management tool, the second container in the network mode associated with the software generated namespace generated by the container management tool; and
executing, by the service provider network, one or more second applications in the second container, wherein executing the one or more second applications in the second container comprises the second container accessing the software generated namespace and following the link to the desired application network namespace.

14. The method of claim 13, further comprising:
determining, by the container management tool, nonexistence of the software generated namespace; and
executing, by the service provider network, the one or more second applications in the second container after creation of the software generated namespace.

15. One or more non-transitory computer-readable media storing computer-executable instructions that, when executed, cause one or more processors to perform operations comprising:
based at least in part on nonexistence of an application network namespace, operating, by a container management tool of a container management service of a service provider network, a first container in a network mode associated with a software generated namespace generated by the container management tool;
determining, by the container management tool, a location of the software generated namespace;
providing, by the container management tool, a link to a desired application network namespace to the software generated namespace;
generating, by the container management tool using an application namespace creation script, a name for the desired application network namespace; and
executing, by the service provider network, one or more first applications in the first container, wherein executing the one or more first applications in the first container comprises the first container accessing the software generated namespace and following the link to the desired application network namespace.

16. The one or more non-transitory computer-readable media of claim 15, wherein the operations further comprise:
initializing, by the container management service, the container management tool to produce the first container, wherein initializing the container management tool further comprises producing internet protocol (IP) table rules and routing rules related to the first container.

17. The one or more non-transitory computer-readable media of claim 16, wherein the operations further comprise:
removing, by the container management tool, the IP table rules and the routing rules related to the first container.

18. The one or more non-transitory computer-readable media of claim 15, wherein the operations further comprise:
removing, by the container management tool, the software generated namespace of components of the software generated namespace, wherein the components comprise IP table rules, routing rules, and an identity of a domain name server (DNS) server.

19. The one or more non-transitory computer-readable media of claim 15, wherein the operations further comprise:
based at least in part on existence of the application network namespace, determining, by the container management tool, whether an application namespace creation script is available;
based at least in part on the application namespace creation script being available, removing, by the container management tool, network resources of the service provider network attached to the application network namespace;
reversing, by the container management tool, container creation rules; and
removing, by the container management tool, the application network namespace from the service provider network.

20. The one or more non-transitory computer-readable media of claim 15, wherein the operations further comprise:
initializing, by the container management tool, a second container for association with the desired application network namespace;
operating, by the container management tool, the second container in the network mode associated with the software generated namespace generated by the container management tool; and
executing, by the service provider network, one or more second applications in the second container, wherein executing the one or more second applications in the second container comprises the second container accessing the software generated namespace and following the link to the desired application network namespace.

\* \* \* \* \*